United States Patent
Ali et al.

(10) Patent No.: US 11,950,128 B2
(45) Date of Patent: Apr. 2, 2024

(54) EDGE OFFLOADING IN A MOBILE NETWORK HAVING A CONVERGED CORE ARCHITECTURE

(71) Applicant: Cisco Technology, Inc., San Jose, CA (US)

(72) Inventors: Irfan Ali, Palo Alto, CA (US); Ravi Kiran Guntupalli, Cumming, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 177 days.

(21) Appl. No.: 17/490,429

(22) Filed: Sep. 30, 2021

(65) Prior Publication Data
US 2023/0102552 A1    Mar. 30, 2023

(51) Int. Cl.
*H04W 28/02* (2009.01)
*H04W 28/08* (2023.01)
*H04W 28/10* (2009.01)

(52) U.S. Cl.
CPC ... *H04W 28/0273* (2013.01); *H04W 28/0268* (2013.01); *H04W 28/09* (2020.05); *H04W 28/10* (2013.01)

(58) Field of Classification Search
CPC ......... H04W 28/0273; H04W 28/0268; H04W 28/09; H04W 28/10; H04W 92/02; H04W 16/08
See application file for complete search history.

(56) References Cited

U.S. PATENT DOCUMENTS

| 10,798,617 B1 | 10/2020 | Ghadge et al. |
| 2012/0295624 A1 | 11/2012 | Tang |
| 2014/0098680 A1 | 4/2014 | Anthony, Jr. et al. |

(Continued)

FOREIGN PATENT DOCUMENTS

WO    2020014337 A1    1/2020

OTHER PUBLICATIONS

Jun, et al., "Ultra-low-latency services in 5G systems: A perspective from 3GPP standards," ETRI Journal. 2020; 42(5):721-733, wileyonlinelibrary.com/journal/etrij, Sep. 2020, 13 pages.
Giust, et al., "MEC Deployments in 4G and Evolution Towards 5G," ETSI White Paper No. 24, ISBN No. 979-10-92620-18-4, First edition—Feb. 2018, 24 pages.

(Continued)

*Primary Examiner* — Omer S Mian
(74) *Attorney, Agent, or Firm* — Edell, Shapiro & Finnan, LLC

(57) ABSTRACT

A control plane (CP) function for session management performs a procedure for establishing local traffic offloading for a user equipment (UE) in a mobile network having an Evolved Packet Core (EPC) and Fifth Generation (5G) converged core that supports communications via a Long-Term Evolution (LTE) radio access network (RAN) and a Fifth Generation (5G) RAN. Initially, a connection is established for the UE via the LTE RAN that includes a first bearer between the LTE RAN and a central serving gateway-user plane (SGW-U) at a central location, and a second bearer between the central SGW-U and a central packet gateway-user plane (PGW-U) at the central location. The CP function inserts a local SGW-U at an edge location and subsequently inserts a local intermediate user plane function (I-UPF) with an uplink classifier (UL-CL) at the edge location for enabling edge offload of traffic from the LTE RAN.

20 Claims, 12 Drawing Sheets

(56) References Cited

U.S. PATENT DOCUMENTS

| | | |
|---|---|---|
| 2015/0373607 A1 | 12/2015 | Zhu |
| 2016/0135103 A1 | 5/2016 | Lee et al. |
| 2017/0048876 A1 | 2/2017 | Mahindra et al. |
| 2019/0098537 A1 | 3/2019 | Qiao et al. |
| 2019/0364456 A1 | 11/2019 | Yu |
| 2020/0068445 A1 | 2/2020 | Wu et al. |
| 2020/0154390 A1 | 5/2020 | Kim |
| 2020/0195762 A1 | 6/2020 | Gan et al. |
| 2020/0245182 A1* | 7/2020 | Chitta ............... H04W 28/0252 |
| 2021/0014733 A1 | 1/2021 | Soliman et al. |
| 2021/0022024 A1 | 1/2021 | Yao et al. |
| 2021/0029608 A1 | 1/2021 | Dodd-Noble et al. |
| 2021/0127271 A1 | 4/2021 | Wu |
| 2021/0153095 A1 | 5/2021 | Yang et al. |
| 2021/0176808 A1* | 6/2021 | Zhu ....................... H04W 76/22 |
| 2021/0360110 A1* | 11/2021 | Steben .................. H04M 15/64 |
| 2022/0264419 A1* | 8/2022 | Mishra ................ H04W 40/246 |
| 2022/0346190 A1* | 10/2022 | Zhu ....................... H04W 76/11 |

OTHER PUBLICATIONS

3GPP, "LTE; General Packet Radio Service (GPRS) enhancements for Evolved Universal Terrestrial Radio Access Network (E-UTRAN) access (3GPP TS 23.401 version 12.6.0 Release 12)," Technical Specification, ETSI TS 123 401 V12.6.0, Sep. 2014, 308 pages.

Kekki, et al., "MEC in 5G Networks," ETSI White Paper No. 28, ISBN No. 979-10-92620-22-1, First edition—Jun. 2018, 28 pages.

3GPP, "3rd Generation Partnership Project; Technical Specification Group Services and System Aspects; 5G System Enhancements for Edge Computing; Stage 2 (Release 17)," Technical Specification, 3GPP TS 23.548 V17.0.0, Sep. 2019, 52 pages.

3GPP, "5G; Procedures for the 5G System (5GS) (3GPP TS 23.502 version 17.6.0 Release 17)," ETSI TS 123 502 V17.6.0, Technical Specification, Sep. 2022, 752 pages.

3GPP, "5G; System architecture for the 5G System (5GS) (3GPP TS 23.501 version 17.6.0 Release 17)," ETSI TS 123 501 V17.6.0, Technical Specification, Sep. 2022, 573 pages.

\* cited by examiner

EDGE OFFLOADING IN A MOBILE NETWORK HAVING A CONVERGED CORE ARCHITECTURE

TECHNICAL FIELD

The present disclosure relates generally to telecommunications systems, and more particularly to techniques and mechanisms for establishing local traffic offloading for a user equipment (UE) in a mobile network having a converged core architecture, such as an Evolved Packet Core (EPC) and Fifth Generation (5G) converged core architecture configured to support communications via a Long-Term Evolution (LTE) radio access network (RAN) and a Fifth Generation (5G) RAN.

BACKGROUND

Traditionally, cellular networks have been designed to provide communications for mobile devices or user equipment (UE) according to Third Generation Partnership Project (3GPP) standards, such as Fourth Generation (4G)/Long Term Evolution (LTE)/Evolved Packet Core (EPC) standards. The 3GPP-defined EPC of the Evolved Packet System (EPS) includes a Mobility Management Entity (MME), a Packet Data Network (PDN) Gateway (PGW), and a Serving Gateway (SGW). In a more advanced Control and User Plane Separation (CUPS) architecture of the EPC, the PGW may be separated into a PGW-control plane (PGW-C) and a PGW-user plane (PGW-U), and the SGW may be separated into a SGW-control plane (SGW-C) and a SGW-user plane (SGW-U).

Today, cellular networks are being upgraded or migrated to Fifth Generation (5G) technology. A 5G System (5GS) utilizes radio access technologies (RATs)/radio access network (RAN) technologies and core functions that are different from the EPS. A 5G deployment is based on the 5G Core (5GC) defined in the 3GPP specifications, and includes functions such as an Access and Mobility Management Function (AMF), a Session Management Function (SMF), and a User Plane Function (UPF).

Multi-Access Edge Computing (MEC) or "edge computing" is made possible in 5G networks. MEC or edge computing is based on an architecture principle of moving services closer to the user, at the edge of a network, to enhance experience and enable delivery of low latency applications. "Edge offload" for local traffic offloading will enable a less expensive and lower-latency path from edge hosts towards the services. Edge offload for a 5G network is captured in 3GPP Technical Specification (TS) 23.501 and TS 23.502, and enhancements for edge offloading are being captured in Release 17 (Rel-17), 3GPP TS 23.548.

In an edge offload for a 5G network, traffic is offloaded from an intermediate UPF (I-UPF) at the "edge," closer to where the UE is located. An uplink classifier (UL-CL) may be provisioned in the UPF to offload selected traffic to the edge. The central, anchor UPF (A-UPF) which advertises the IP address of the UE may be located at a more "central" location.

Now, interworking between 4G and 5G will play an important role in the deployment of 5G which will initially rely on the 4G/LTE/EPC as its underlying system. In the 3GPP architecture for interworking, "combined" or "converged" components are provided to implement what may be referred to as a "converged 4G/5G network." Here, the SMF and the PGW-C may be provided as a combined entity (i.e. an SMF+PGW-C), and the UPF and the PGW-U are provided as a combined entity (i.e. a UPF+PGW-U). The SMF+PGW-C may operate to maintain a control signalling session, via an N4/Sx interface, with the UPF+PGW-U for managing a Packet Data Unit (PDU) session/PDN connection for the UE. Since the SMF+PGW-C serves as a dedicated control plane "anchor" for the PDU session/PDN connection, seamless session continuity and IP address preservation may be realized for a UE moving from one system to the other.

Unfortunately, MEC edge offloading is not available for a UE that operates via the LTE RAN (i.e. 4G) in the converged 4G/5G network. For years to come, 5G coverage will be much more limited than 4G coverage. Given that edge offloading is not available for 4G communications in a converged 4G/5G network, there remains a deficiency in planned network operations.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1:
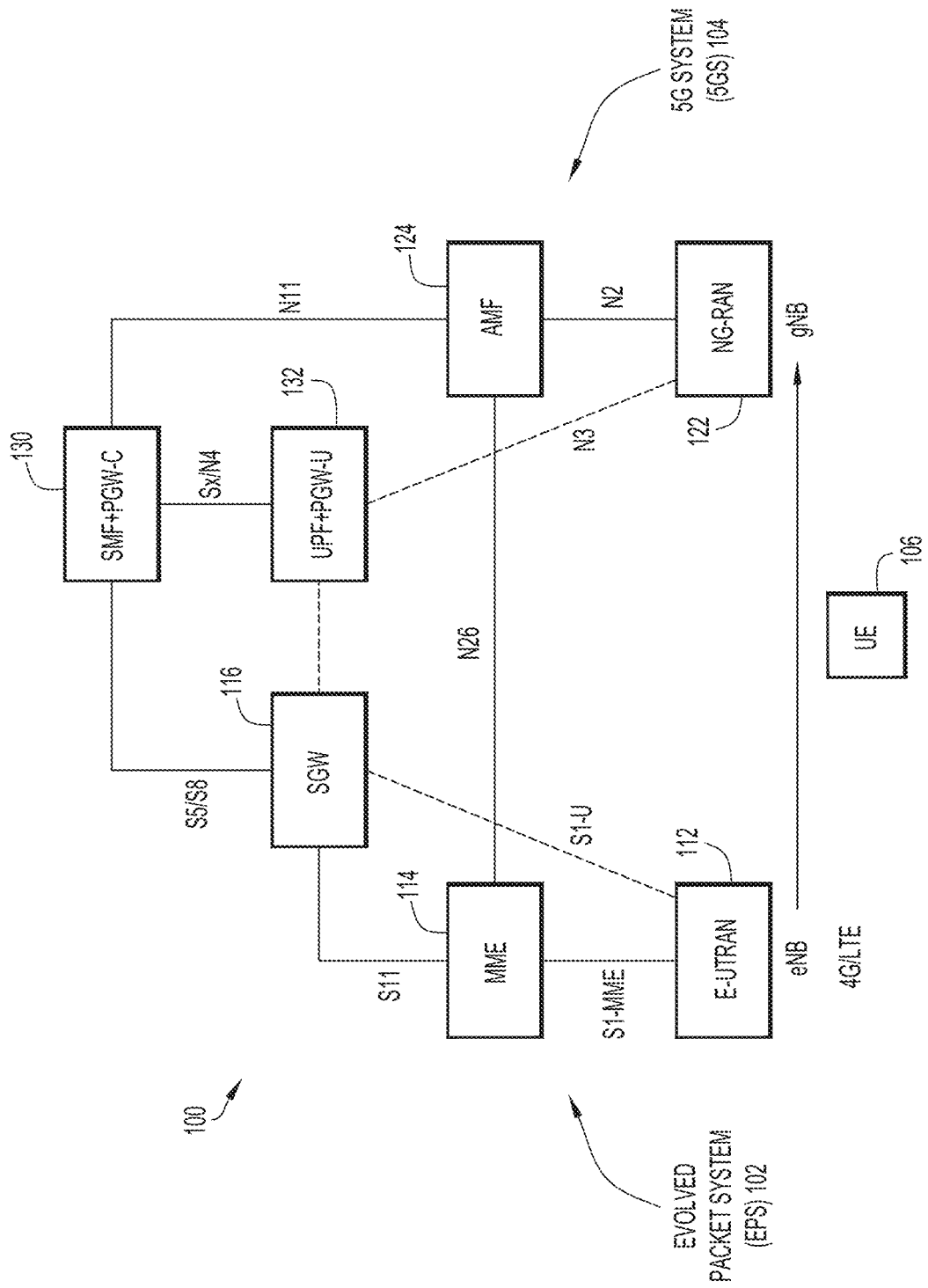
FIG. 1 is an illustrative representation of a Third Generation Partnership (3GPP) based mobile network having a converged core architecture for interworking between an Evolved Packet System (EPS) and a Fifth Generation (5G) System (5GS)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for establishing edge offloading in a mobile network having a converged core architecture are described herein.

In one illustrative example, a method is described for establishing local traffic offloading for a user equipment (UE) by a control plane (CP) function for session management of a mobile network having a converged core architecture to support communications of the UE via a first radio access network (RAN) of a first RAN type and a second RAN of a second RAN type. In some implementations, the converged core architecture may be or include an Evolved Packet Core (EPC) and Fifth Generation (5G) converged core, the first RAN may be of a Long-Term Evolution (LTE) RAN type, and the second RAN may be of a Fifth Generation (5G) RAN type. The UE may operate in the mobile network having the converged core architecture via the first RAN (i.e. the LTE RAN), and in some implementations, the UE may be a 4G/LTE-only operational device.

Initially, a connection is established for the UE operating via the first RAN of the first RAN type (e.g. the LTE RAN type). The connection may include a first bearer between the RAN and a first central user plane network function at a central location, and a second bearer between the first central user plane network function and a second central user plane network function at the central location. The CP function for session management may manage the connection for the UE operating via the first RAN of the first RAN type. With this connection as the starting point, the CP function for session management may perform a procedure for establishing local traffic offloading ("edge offload") for the UE.

The procedure for establishing local traffic offloading may include communicating one or more first messages for inserting a first local user plane network function at an edge location. The one or more first messages for inserting the first local user plane network function at the edge location may be communicated to update the first bearer to be between the RAN and the first local user plane network function at the edge location, and the second bearer to be between the first local user plane network function at the edge location and the second central user plane network function at the central location.

The procedure for establishing local traffic offloading may further include communicating one or more second messages for inserting a second local user plane network function with an uplink classifier at the edge location. The one or more second messages for inserting the second local user plane network function with the uplink classifier at the edge location may be communicated to update the second bearer to be between the first and the second local user plane network functions at the edge location, and to establish a third bearer of the connection to be between the second local user plane network function at the edge location and a third central user plane network function at the central location.

In some implementations, the CP function for session management may be a converged CP function for session management at the central location (e.g. a converged or combined session management function "SMF" and packet data network gateway-control plane "PGW-C," or "SMF+PGW-C"). In an EPC and 5G converged core, the first central user plane network function at the central location may be a central serving gateway-user plane (SGW-U); the second central user plane network function at the central location may be a central "combined" user plane function (UPF) and PGW-user plane (PGW-U) (e.g. UPF+PGW-U); the first local user plane network function at the edge location may be a local SGW-U; the second local user plane network function at the edge location may be a local "combined" intermediate UPF (I-UPF) and PGW-U (I-UPF+PGW-U) having the uplink classifier (UL-CL); and the third central user plane network function at the central location may be a central anchor UPF (A-UPF). In some implementations, the first bearer may be an S1-U bearer, the second bearer may be an S5-U bearer, and the third bearer may be an N9 connection.

In some implementations, communicating the one or more first messages for inserting the first local user plane network function (e.g. the local SGW-U) at the edge location may involve communicating a first message which indicates a request for bearer update (e.g. an update bearer request), where the message includes a data network access identifier (DNAI) associated with the edge location. In some implementations, communicating the first message which indicates the request for bearer update causes a corresponding message which indicates the request for bearer update (e.g. an update bearer request) to be communicated to a mobility management entity, where the corresponding message includes an identifier associated with the first local user plane network function at the edge location. In some implementations, the identifier associated with the first local user plane network function at the edge location may be a tunnel endpoint identifier (TEID).

In some implementations, communicating the one or more second messages for inserting the second local user plane network function (e.g. the local I-UPF+PGW-U) with the uplink classifier (e.g. the UL-CL) at the edge location may involve communicating a second message which indicates a request for bearer update (e.g. an update bearer request), where the second message includes an identifier associated with the second local user plane network function with the uplink classifier at the edge location. In some implementations, the identifier associated with the second local user plane network function with the uplink classifier at the edge location may be a TEID.

In another illustrative example, a computer program product comprises a non-transitory computer readable medium and instructions in the non-transitory computer readable medium, where the instructions are executable by one or more processors of the CP function for session management of the mobile network having the converged core architecture for performing the method as described above.

In yet another illustrative example, a network node comprising a CP function for session management of a mobile network is described, with the mobile network having an EPC and 5G converged core configured to support communications of a UE via an LTE RAN and a 5G RAN. The network node has one or more processors, one or more interfaces to connect in the mobile network, and one or more memory elements for storing instructions executable on the one or more processors for operation as the CP function for session management. The one or more processors may operate for managing a connection for the UE operating via the LTE RAN, where the connection includes a first bearer between the LTE RAN and a central SGW-U at a central location, and a second bearer between the central SGW-U at the central location and a central UPF+PGW-U at the central location. The one or more processors may further operate for performing a procedure for establishing local traffic offloading ("edge offload") for the UE. Performing the procedure for establishing the local traffic offloading for the UE may involve communicating one or more first messages for inserting a local SGW-U at an edge location, to update the first bearer to be between the LTE RAN and the local SGW-U at the edge location, and the second bearer to be between the local SGW-U at the edge location and the central UPF+PGW-U at the central location. Performing the procedure for establishing the local traffic offloading for the UE may further involve communicating one or more second messages for inserting a local I-UPF+PGW-U with an UL-CL at the edge location, to update the second bearer to be between the local SGW-U and the local I-UPF+PGW-U with the UL-CL at the edge location, and to establish a third bearer of the connection to be between the local I-UPF+PGW-U at the edge location and a central A-UPF at the central location.

In some implementations, the one or more processors are further operative for communicating the one or more first messages for inserting the local SGW-U at the edge location by communicating a first message which indicates a request for bearer update (e.g. an update bearer request), where the first message includes a DNAI associated with the edge location, In some implementations, communicating the first message causes a corresponding message which indicates the request for bearer update (e.g. an update bearer request) to be communicated to a mobility management entity (MME), where the corresponding message includes a TEID associated with the local SGW-U at the edge location. In some implementations, the one or more processors are further operative for communicating the one or more second messages for inserting the local I-UPF+PGW-U with the UL-CL at the edge location by communicating a second message which indicates a request for bearer update (e.g. an update bearer request), the second message including a TEID associated with the local I-UPF+PGW-U with the UL-CL at the edge location. In some implementations, the first bearer comprises an S1-U bearer, the second bearer comprises an S5-U bearer, and the third bearer comprises an N9 connection. In some implementations, the CP function for session management may be an SMF+PGW-C at the central location.

More detailed and alternative techniques and implementations are provided herein as described below.

Example Embodiments

As described in the Background section, Multi-Access Edge Computing (MEC) or "edge computing" is made possible in Fifth Generation (5G) networks. MEC or edge computing is based on an architecture principle of moving services closer to the user, at the edge of a network, to enhance experience and enable delivery of low latency applications. "Edge offload" for local traffic offloading will enable a less expensive and a lower-latency path from edge hosts towards the services.

Edge offload in a 5G network is captured in Third Generation Partnership Project (3GPP) 3GPP Technical Specification (TS) 23.501 and TS 23.502, and enhancements for edge offloading are being captured in Release 17 (Rel-17), 3GPP TS 23.548. In an edge offload in a 5G network, traffic is offloaded from an intermediate user plane function (UPF) (I-UPF) at the "edge," closer to where a user equipment (UE) is located. An uplink classifier (UL-CL) may be provisioned in the UPF to offload selected traffic to the edge. An anchor UPF (A-UPF) which advertises the IP address of the UE may be located at a more "central" location.

Interworking between 4G and 5G will play an important role in the deployment of 5G, which will initially rely on the 4G, Long-Term Evolution (LTE), Evolved Packet Core (EPC) as its underlying system. In the 3GPP architecture for interworking, "combined" or "converged" components are provided to implement what may be referred to as a "converged 4G/5G network." Here, a session management function (SMF) and a packet data network (PDN) gateway (PGW)-control plane (PGW-C) are provided as a combined entity (i.e. an SMF+PGW-C), and the UPF and a PGW-user plane (PGW-U) are provided as a combined entity (i.e. a UPF+PGW-U). The SMF+PGW-C may operate to maintain a control signalling session, via an N4/Sx interface, with the UPF+PGW-U for managing a packet data unit (PDU) session/PDN connection for the UE. Since the SMF+PGW-C may serve as a dedicated control plane "anchor" for the PDU session/PDN connection, seamless session continuity and IP address preservation are made realizable for a UE moving from one system to the other.

With reference now to FIG. 1, an illustrative representation of a 3GPP-based mobile network 100 having a 3GPP core architecture for interworking between an Evolved Packet System (EPS) 102 and a 5G system (5GS) 104 is shown. EPS 102 of 3GPP-based mobile network 100 includes an Evolved Universal Terrestrial Radio Access Network (E-UTRAN) 112 and core functionality associated with an EPC. E-UTRAN 112 may be for LTE based access, and may include one or more base stations such as an eNodeB (eNB). The EPC of EPS 102 may include core functionality associated with at least a mobility management entity (MME) 114 and a serving gateway (SGW) 116. The EPC of EPS 102 may include a Control and User Plane Separation (CUPS) architecture, where SGW 116 is separated into a SGW-control plane (SGW-C, or simply "SGW") and a SGW-user plane (SGW-U).

The 5GS 104 of 3GPP-based mobile network 100 includes a Next-Generation (NG) RAN (NG-RAN) 122 (or "5G RAN") and core functionality associated with the 5G core (5GC). NG-RAN 122 is for 5G radio access, and may include one or more base stations such as a gNodeB (gNB). The 5GC of 5GS 104 may include core functionality associated with at least an Access and Mobility Management Function (AMF) 124 and a Policy Control Function (PCF) (not shown in FIG. 1). In the enterprise environment, policy control may be provided using pre-existing policy control mechanisms, and therefore a standard PCF may be excluded from use in 3GPP-based mobile network 100.

For interworking in 3GPP-based mobile network 100, the SMF and the PGW-C may be provided as a combined entity (i.e. an SMF+PGW-C 130), and a UPF and a PGW-U may be provided as a combined entity (i.e. a UPF+PGW-U 132) as shown. Interfaces between the elements, functions, or modules in 3GPP-based mobile network 100, such as interfaces for S1-MME, S1-U, S11, S5, S8, Sx, N2, N3, N4, and N11, as shown, are described in relevant 3GPP specifications. For interworking, an N26 interface between MME 114 and AMF 124 has been introduced as an inter-core network (CN) interface for seamless session continuity.

A user equipment (UE) 106 may be configured for communications in 3GPP-based mobile network 100. UE 106 may be any suitable type of communication device, such as a cellular telephone, a smart phone, a tablet device, a gaming device, an Internet of Things (IoT) device, and a Machine-To-Machine (M2M) device, to name a few. In general, UE 106 may be registered with 3GPP-based mobile network 100 and be able move from one cell to another cell. UE 106 may operate to communicate in either EPS 102 via E-UTRAN 112 (e.g. eNB) or 5GS 104 via NG-RAN 122 (e.g. gNB).

As depicted in FIG. 1, UE 106 has access to the network via E-UTRAN 112 of EPS 102, but may subsequently need access via NG-RAN 122 in 5GS 104. This change may be needed in response to an LTE coverage loss after relocation of UE 106 or in response to the ending of a voice call that was initially established based on "EPS fallback," as a couple of examples. Accordingly, communications for UE 106 may be switched from E-UTRAN 112 of EPS 102 to NG-RAN 122 of 5GS 104. At this time, SMF+PGW-C 130 may maintain a control signalling session with UPF+PGW-U 132 for managing a PDN connection (or a Protocol Data Unit "PDU" session) of UE 106. The control signalling session may be a Packet Forwarding Control Protocol (PFCP) session which is maintained over the Sx/N4 interface. During a handover or mobility event, MME 114 and AMF 124 exchange GPRS Tunneling Protocol (GTP) version 2 (GTPv2) messages via the N26 interface for transferring UE's 106 context. As SMF+PGW-C 130 serves as a dedicated control plane "anchor" for the PDN connection (or the PDU session), seamless session continuity and IP address preservation are realized for UE 106 moving from one system to the other.

Again, edge offloading in a 5G network is captured in 3GPP TS 23.501 and TS 23.502, and enhancements for edge offloading are being captured in Release 17 (Rel-17), 3GPP TS 23.548. In an edge offload in a 5G network (to be described in more detail later with reference to FIG. 6), traffic is offloaded from an I-UPF at the "edge," closer to where the UE is located. An UL-CL may be provisioned in this UPF to offload selected traffic to the edge. A central A-UPF which advertises the IP address of the UE may be located at a central location.

However, MEC edge offloading is not available for a UE that operates via the LTE RAN (i.e. 4G) in the converged 4G/5G network. For years to come, 5G coverage will be much more limited than 4G coverage. Even further, the UE may be a 4G/LTE-only operational device. Given that edge offloading is not available for 4G communications in a converged 4G/5G network, there remains a deficiency in planned network operations.

What are needed are techniques and mechanisms for establishing edge offloading in a mobile network having a converged core architecture (e.g. for a UE that operates via 4G/LTE).

Figure 2:
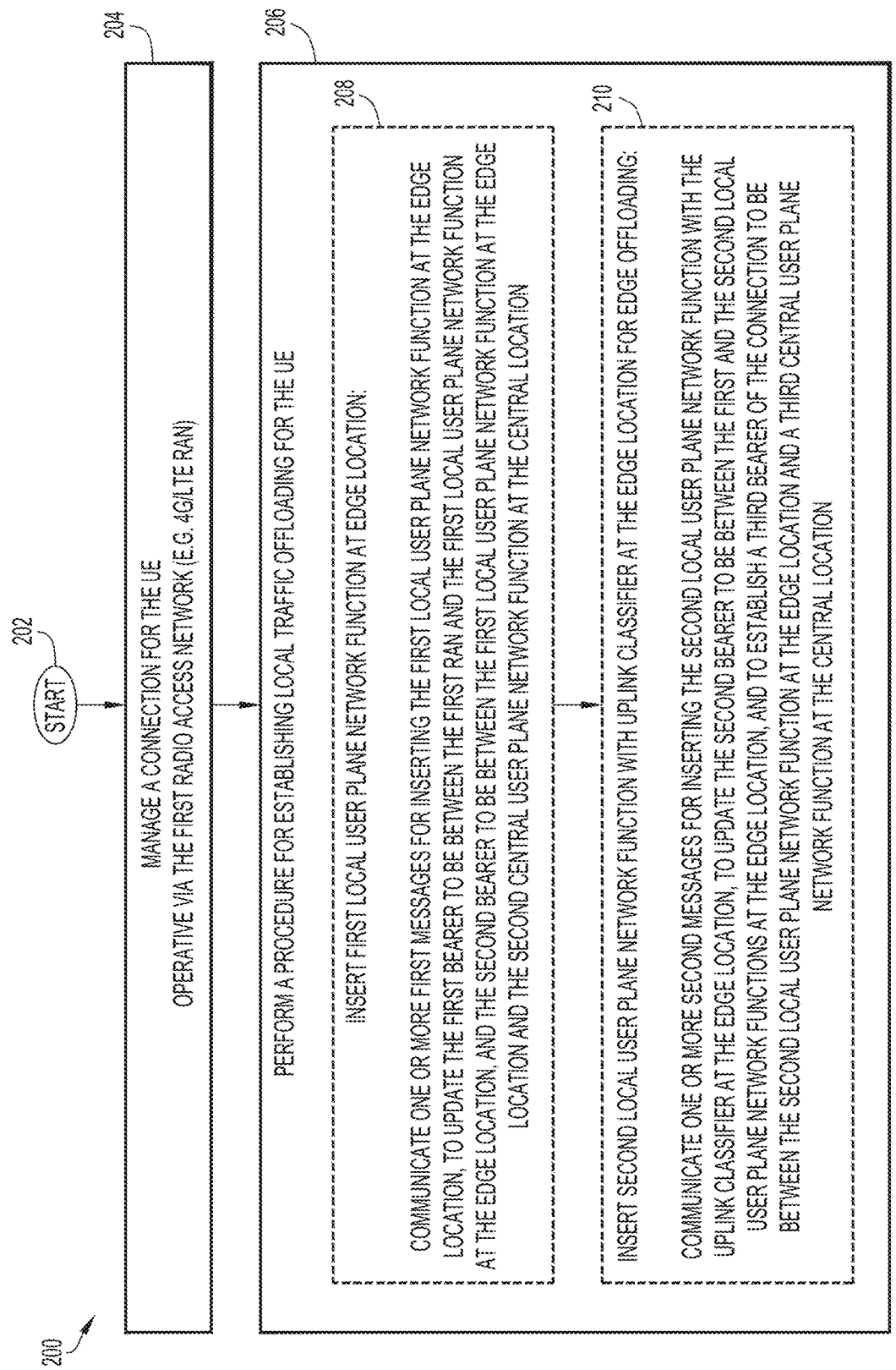
FIG. 2 is a flowchart for describing a method for establishing local traffic offloading ("edge offload") for a user equipment (UE) in a mobile network having a converged core architecture according to some implementations of the present disclosure.

FIG. 2 is a flowchart 200 for describing a method for establishing local traffic offloading ("edge offload") for a UE in a mobile network having a converged core architecture according to some implementations is shown. The converged core architecture is configured to support communications of the UE via a first RAN of a first RAN type and a second RAN of a second RAN type. The method may be performed by a CP function for session management, which may be part of the converged core architecture. The method may be embodied in a computer program product which includes a non-transitory computer readable medium and instructions stored in the non-transitory computer readable medium, where the instructions are executable by one or more processors of a network node having the CP function for session management (e.g. a CP function node). In some implementations, the converged core architecture may be or include an EPC and 5G converged core, the first RAN may be of the LTE RAN type, and the second RAN may be the 5G RAN type.

Initially, a connection is established for the UE operative via the first RAN of the first RAN type (e.g. the LTE RAN). The connection may include a first bearer between the first RAN and a first central user plane network function at a central location, and a second bearer between the first central user plane network function and a second central user plane network function at the central location. Beginning at a start block 202 of FIG. 2, the CP function for session management may manage the connection for the UE operative via the first RAN of the first RAN type (step 204 of FIG. 2). With this connection as the starting point, the CP function for session management may perform a procedure for establishing local traffic offloading (e.g. edge offload) for the UE (step 206 of FIG. 2). The CP function for session management may operate to initiate or trigger this procedure.

The procedure for establishing local traffic offloading of step 206 may include communicating one or more first messages for inserting a first local user plane network function at an edge location (step 208 of FIG. 2). The one or more first messages for inserting the first local user plane network function at the edge location may be performed to update the first bearer to be between the first RAN and the first local user plane network function at the edge location, and the second bearer to be between the first local user plane network function at the edge location and the second central user plane network function at the central location.

The procedure for establishing local traffic offloading of step 206 may further include communicating one or more second messages for inserting a second local user plane network function with an uplink classifier at the edge location (step 210 of FIG. 2). The one or more second messages for inserting the second local user plane network function with the uplink classifier at the edge location may be performed to update the second bearer to be between the first and the second local user plane network functions at the edge location, and to establish a third bearer of the connection to be between the second local user plane network function at the edge location and a third central user plane network function at the central location.

In some implementations, the first central user plane network function at the central location may be or include a central SGW-U; the second central user plane network function at the central location may be or include a central PGW-U (or a central UPF+PGW-U); the first local user plane network function at the edge location may be or include a first local SGW-U; the second local user plane network function at the edge location may be or include an I-UPF with the UL-CL (or an I-UPF+PGW-U with the UL-CL); and the third central user plane network function at the central location may be or include an A-UPF. In some implementations, the first bearer may be an S1-U bearer, the second bearer may be an S5-U bearer, and the third bearer may be an N9 connection. In some implementations, the CP function for session management is or includes an SMF+PGW-C.

In some implementations, communicating the one or more first messages in step 208 for inserting the first local user plane network function (e.g. the at the edge location may involve communicating a first message which indicates a request for bearer update (e.g. an update bearer request), where the message includes a data network access identifier (DNAI) associated with the edge location. In some implementations, communicating the first message which indicates the request for bearer update causes a corresponding message which indicates the request for bearer update (e.g. an update bearer request) to be communicated to an MME, where the corresponding message includes an identifier associated with the first local user plane network function at the edge location. In some implementations, the identifier associated with the first local user plane network function at the edge location may be a tunnel endpoint identifier (TEID).

In some implementations, communicating the one or more second messages in step 210 for inserting the second local user plane network function with the uplink classifier at the edge location may involve communicating a second message which indicates a request for bearer update (e.g. an update bearer request), where the second message includes an identifier associated with the second local user plane network function with the uplink classifier at the edge location. In some implementations, the identifier associated with the second local user plane network function with the uplink classifier at the edge location may be a TEID.

Figure 3A:
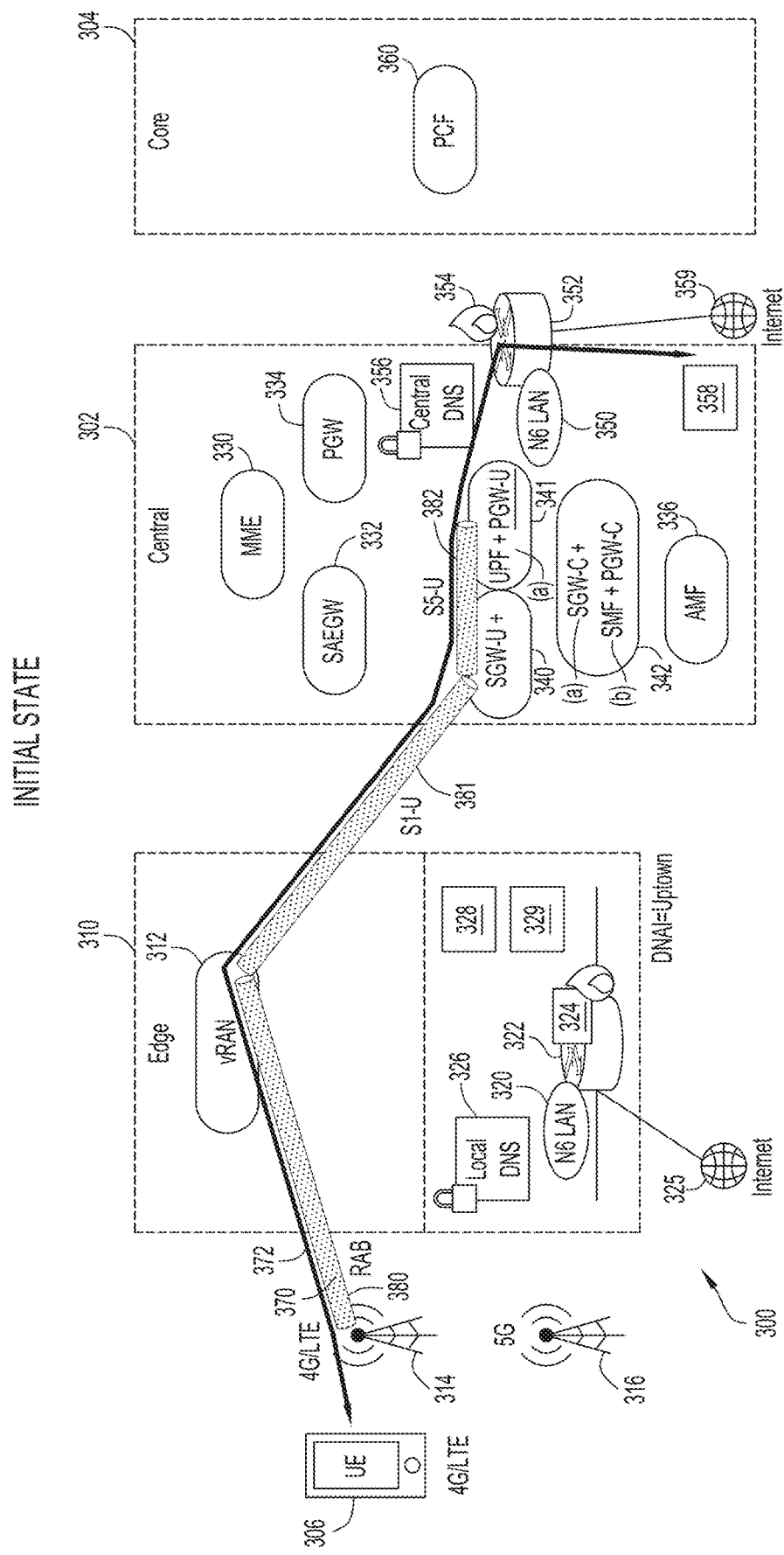
FIGS. 3A-3C are illustrative scenarios in a mobile network having a converged core architecture configured to support communications for a UE via a first radio access network (RAN) of a first RAN type or a second RAN of a second RAN type, where the UE is operating via the first RAN (e.g. Long-Term Evolution "LTE" RAN), according to some implementations of the present disclosure.
Figure 3B:
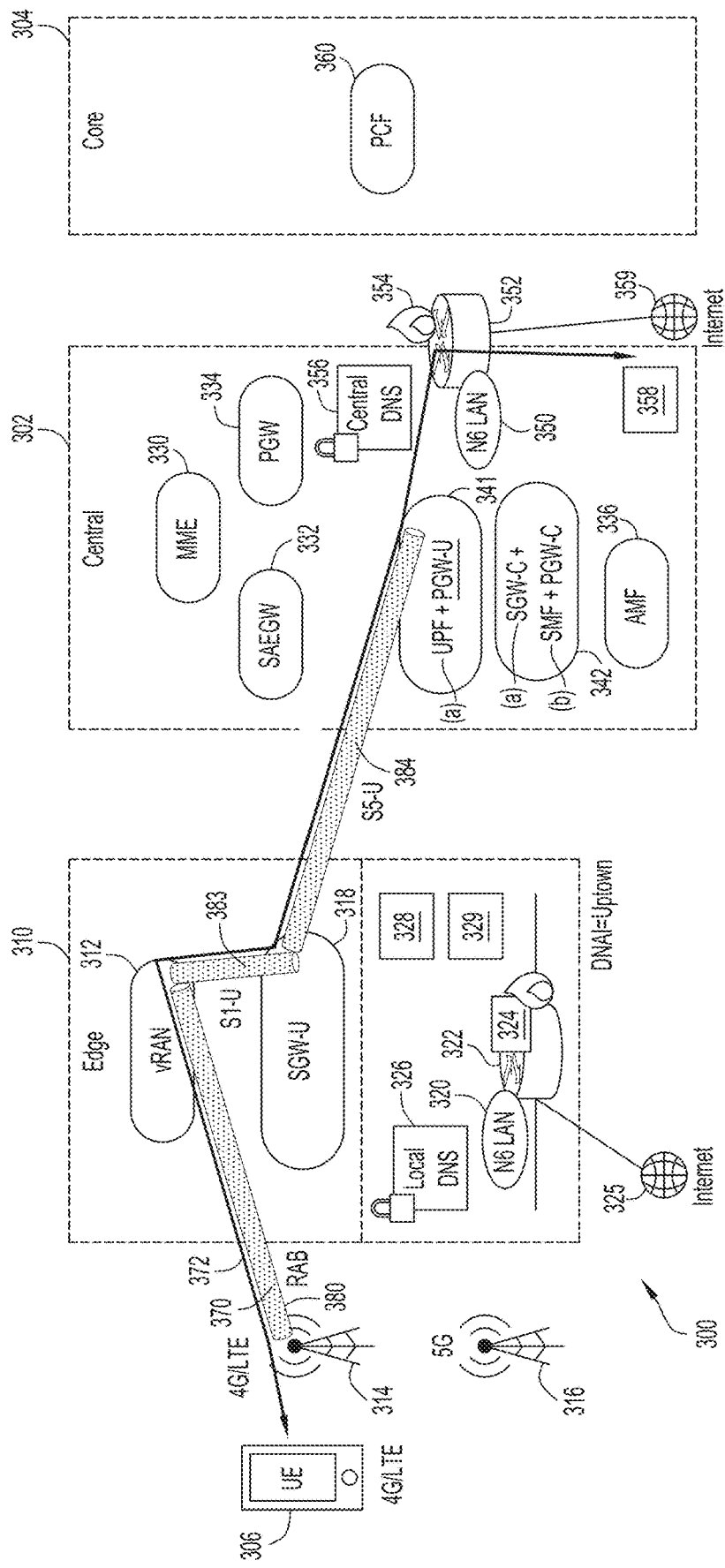
Figure 3C:
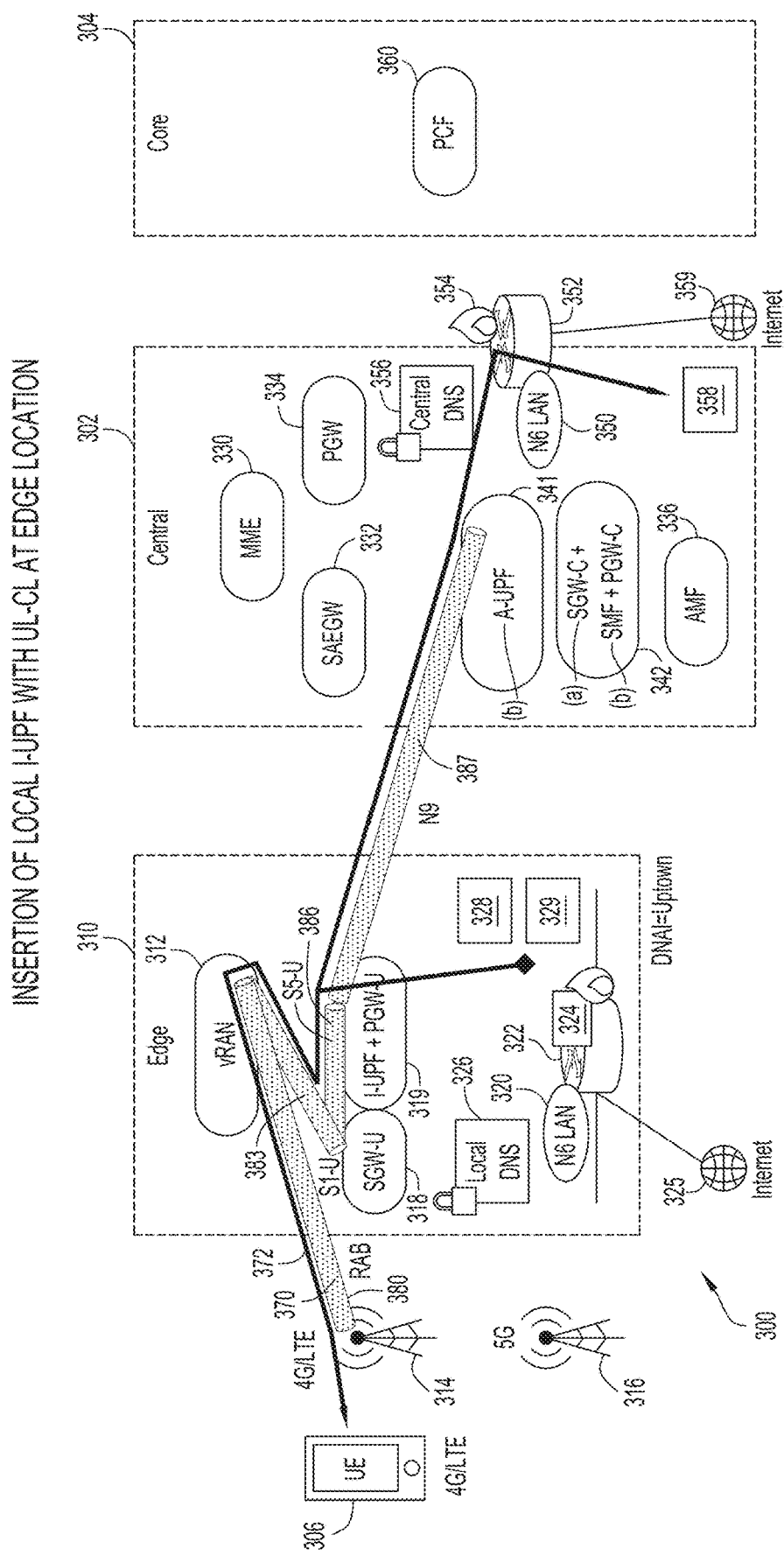

FIGS. 3A-3C illustrate scenarios of a 3GPP mobile network 300 having a converged core architecture (e.g. EPC and 5G converged core) configured to support communications for a UE 306 via a first RAN of a first RAN type (e.g. an LTE RAN 314) or a second RAN of a second RAN type (e.g. a 5G RAN 316), where UE 306 is operating via LTE RAN 314. In some implementations, UE 306 is a 4G/LTE-only operational device (e.g. it does not support 5G NR or have a subscription for 5G service).

In FIG. 3A, components associated with 3GPP mobile network 300 having the converged core architecture may be provided in a central location 302, a core location 304, and an edge location 310 that is (more) closely located to UE 306. At central location 302, 3GPP mobile network 300 may include an MME 330, a system architecture evolution gateway (SAEGW) 332, a PGW 334, and an AMF 336. Also at central location 302 is a user plane network function(s) 341 which may include an SGW-U 340 and a UPF+PGW-U 341a, as well as a control plane network function(s) 342 for session management, which may include an SGW-C 342a and/or an SMF+PGW-C 342b. These functions may or may not be co-located on the same network node. Even further at central location 302 is a central N6 interface-based local area network (LAN) (central N6 LAN) 350 which includes a router 352 having a firewall 354 and a central domain name system (DNS) server 356. A plurality of services, such as a videoconferencing service 358 (e.g. a BlueJeans service) and an Internet data service 359, may be provided via central N6 LAN 350 at central location 302. At core location 304, the 3GPP mobile network 300 may include a PCF 360.

At edge location 310, the 3GPP mobile network 300 may include one or more virtual RAN (vRAN) components 312 associated with LTE RAN 314 and/or 5G RAN 316. These functions may or may not be co-located on the same network node. Also at edge location 310 is a local N6 interface-based LAN (local N6 LAN) 320 including a router 322 having a firewall 324 and a local DNS server 326. A plurality of services, such as a videoconferencing service 328 (e.g. a BlueJeans service), a video streaming service 329 (e.g. a NetFlix service), and an Internet data service 325, may be provided via local N6 LAN 320 at edge location 310. The edge network at edge location 310 may be identified with a DNAI of "Uptown" as indicated in FIG. 3A.

In FIG. 3A, an initial state of a connection 370 for UE 306 operating via LTE RAN 314 with no local offloading is shown, which may correspond to the initial state of the connection in step 204 of the flowchart of FIG. 2. Here, connection 370 of FIG. 3A may be defined at least by a radio access bearer (RAB) 380, an S1-U bearer 381 between vRAN 312 and SGW-U 340 at central location 302, and an S5-U bearer 382 between SGW-U 340 and the PGW-U (of UPF+PGW-U 341a) at central location 302. As illustrated, a portion of data traffic 372 associated with one or more data flows may be routed via central N6 LAN 350 at central location 302 (e.g. for videoconferencing service 358 and/or Internet data service 359).

In FIG. 3B, an SGW-U 318 at edge location 310 has been inserted to modify connection 370 of UE 306 as a first step for establishing local offloading for UE 306, which may correspond to step 208 of the flowchart of FIG. 2. As illustrated, connection 370 is updated to reestablish an S1-U bearer 383 to be between vRAN 312 and SGW-U 318 at edge location 310, and an S5-U bearer 384 to be between SGW-U 318 at edge location 310 and the PGW-U (of UPF+PGW-U 341a) at central location 302.

In FIG. 3C, an I-UPF (of an I-UPF+PGW-U 319) with an UL-CL at the edge location has been inserted to further modify connection 370 of UE 306 as a second step for establishing the local offloading for UE 306, which may correspond to step 210 of the flowchart of FIG. 2. As illustrated, connection 370 is updated to reestablish an S5-U bearer 386 to be between SGW-U 318 and the I-UPF (of UPF+PGW-U 319) at edge location 310, and to establish an N9 connection 387 between the I-UPF (of UPF+PGW-U 319) at edge location 310 and an A-UPF 341b at central location 302. As illustrated, the portion of data traffic 372 associated with one or more data flows may now be routed via local N6 LAN 320 at edge location 310.

Figure 4A:
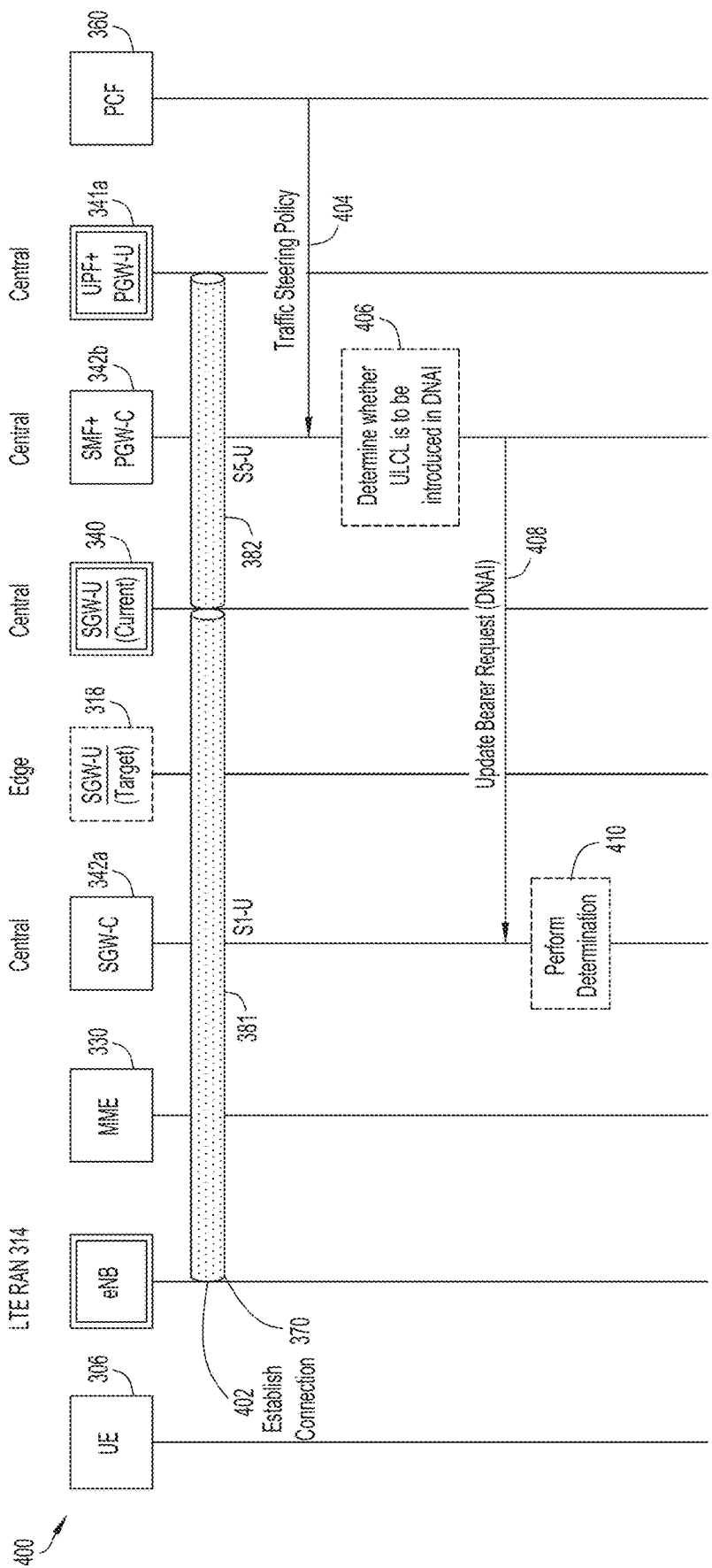
FIGS. 4A-4C form a call flow diagram for describing a call flow for establishing local traffic offloading for a UE in a mobile network having a converged core architecture according to some implementations of the present disclosure, specifically relating to a first step for inserting a first local user plane function at an edge location.
Figure 4B:
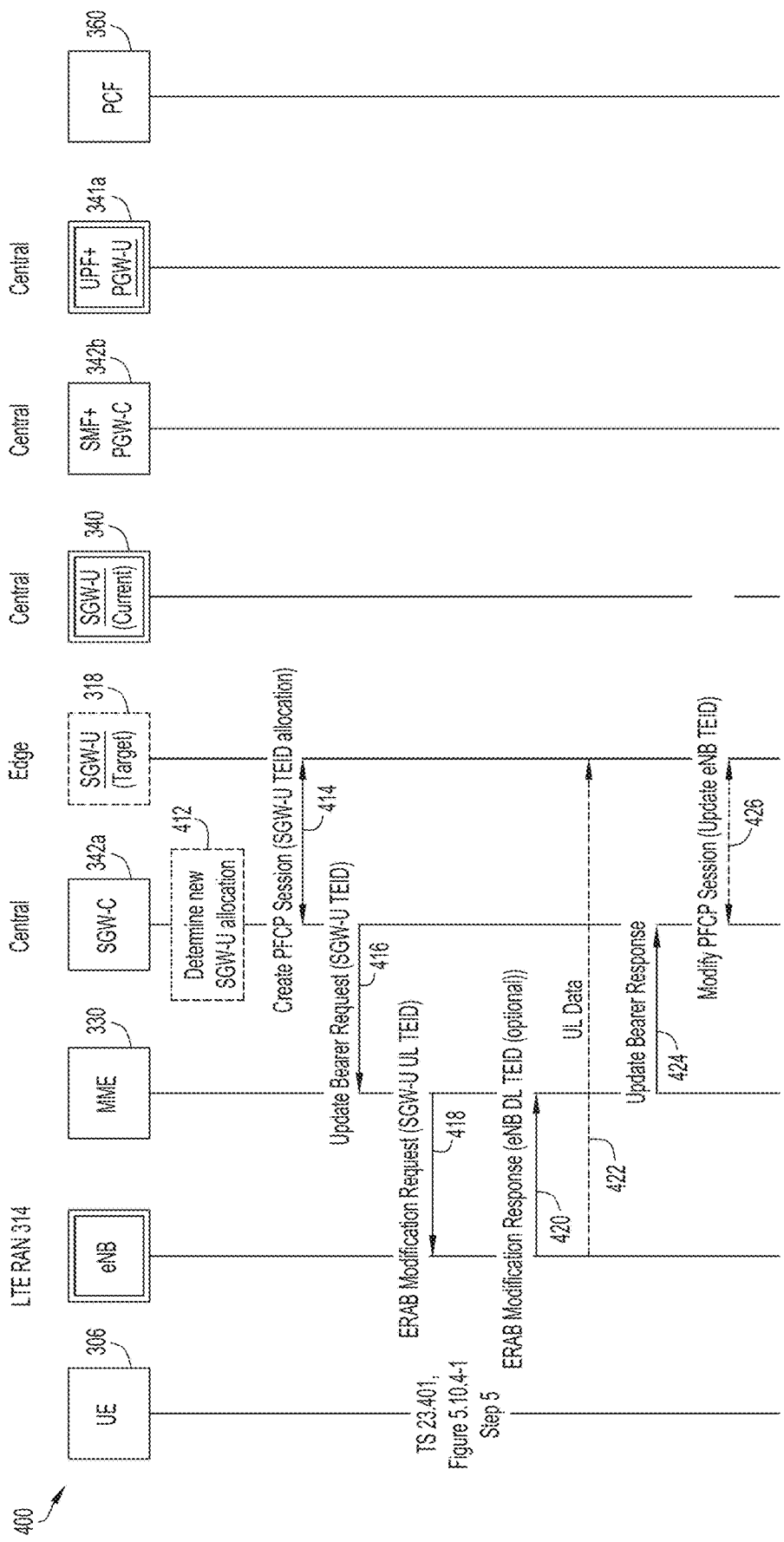
Figure 4C:
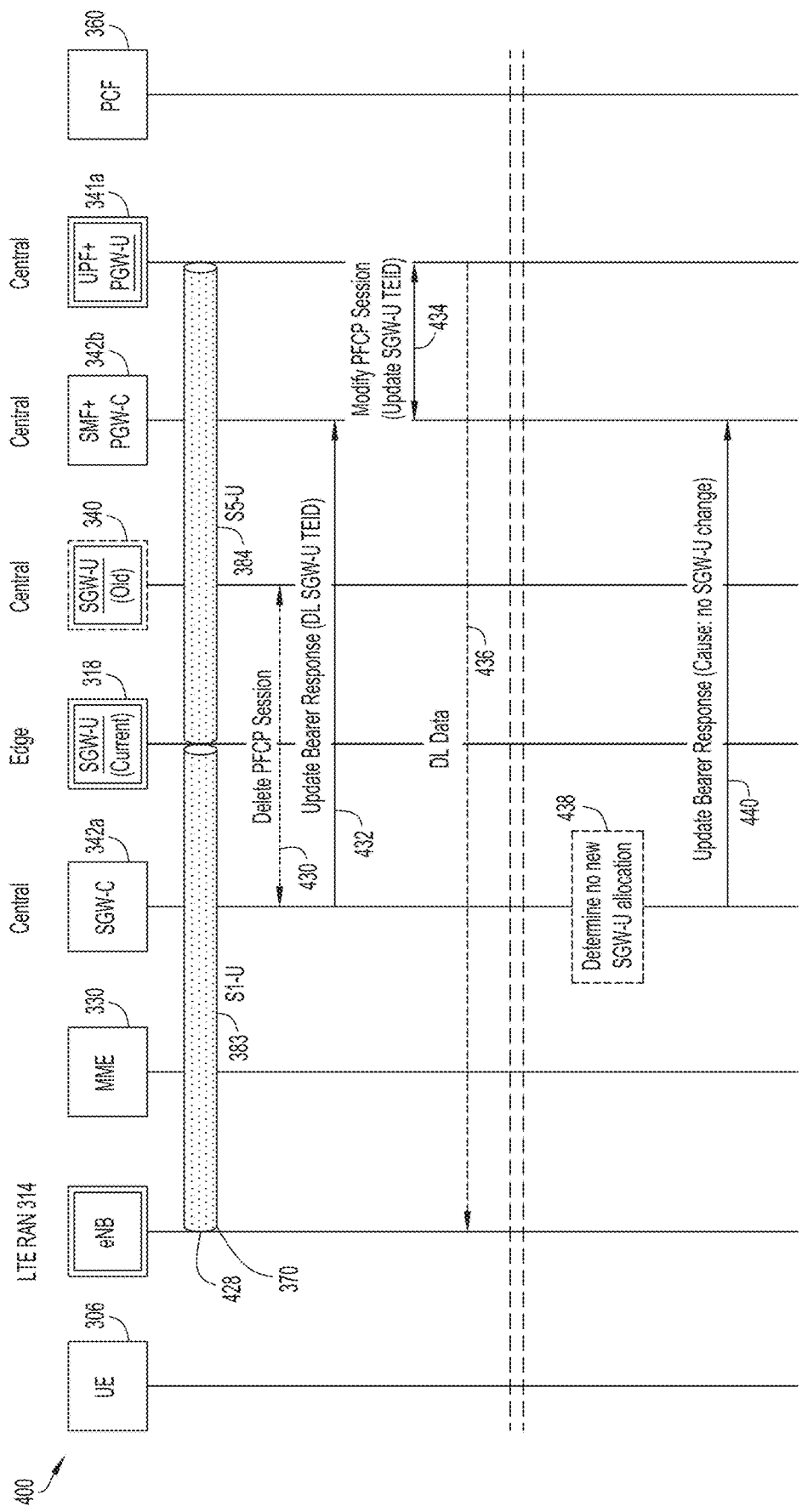

FIGS. 4A-4C form a call flow diagram 400 for describing a call flow for establishing local traffic offloading ("edge offload") for a UE in a mobile network having a converged core architecture according to some implementations. In particular, call flow diagram 400 of FIGS. 4A-4C relates to the insertion of the first local user plane function at the edge location (e.g. the local SGW-U) associated with step 208 of FIG. 2, which may result in the intermediate connection configuration shown in FIG. 3B.

In FIG. 4A, connection 370 for UE 306 is established (step 402 of FIG. 4A). Connection 370 may be managed by the control plane (e.g. at least in part by SMF+PGW-C 342b). Initially, connection 370 may be defined at least in part by S1-U bearer 381 between LTE RAN 314 (e.g. the eNB) and SGW-U 340 at the central location, and S5-U bearer 382 between SGW-U 340 and the PGW-U (of UPF+PGW-U 341a) at the central location. With connection 370, no local traffic offloading at the edge location of UE 306 can be facilitated. Here, SGW-U 340 at the central location is the current SGW-U and SGW-U 318 at the edge location is the target SGW-U.

After connection 370 is established, PCF 360 may send to SMF+PGW-C 342b a message which includes a traffic steering policy (step 404 of FIG. 4A). SMF+PGW-C 342b at the central location may receive and process this message including the traffic steering policy, and determine whether an UL-CL should be introduced in the data network at the edge location of UE 306 (step 406 of FIG. 4A). SMF+PGW-C 342b may send to SGW-C 342a at the central location a message which indicates a request to update the bearer (e.g. an update bearer request) (step 408 of FIG. 4A). The message which indicates the request to update the bearer of step 408 may include the DNAI of the data network at the edge location of UE 306. As is apparent, SMF+PGW-C 342b may initiate or trigger the procedure for local traffic offloading. SGW-C 342a at the central location may receive and process the message which indicates the request to update the bearer, and perform a determination of whether a new SGW-U should be allocated at the edge location (step 410 of FIG. 4A). The call flow may continue in the call flow diagram 400 of FIG. 4B.

In FIG. 4B, SGW-C 342*a* at the central location may determine that a new SGW-U should be allocated at the edge location of UE 306 (step 412 of FIG. 4B). SGW-C 342*a* may select an SGW-U based on the received DNAI from step 408. SGW-C 342*a* at the central location may send to SGW-U 318 at the edge location a message to create a PFCP session, and receive a response to such message (step 414 of FIG. 4B). In step 414, SGW-C 342*a* may obtain a TEID of SGW-U 318 at the edge location, which is an uplink (UL) TEID. SGW-C 342*a* at the central location may then send to MME 330 a message which indicates a request to update the bearer (e.g. an update bearer request) which may include the UL TEID of SGW-U 318 at the edge location (step 416 of FIG. 4B). MME 330 may send to LTE RAN 314 (the eNB) a message which indicates an E-UTRAN radio access bearer (ERAB) modification request which may include the UL TEID of SGW-U 318 (step 418 of FIG. 4B). LTE RAN 314 (the eNB) may receive and process the message which indicates the ERAB modification request. LTE RAN 314 (the eNB) may send to MME 330 a message which indicates an ERAB modification response which may include a DL TEID of LTE RAN 314 (the eNB) (step 420 of FIG. 4B). Note that steps 418 and 420 may follow the procedure described in 3GPP TS 23.401 (e.g. FIG. 5.10.4-1, step 5 thereof). As the UL TEID has been properly reallocated, UL data may be communicated between LTE RAN 314 (the eNB) and SGW-U 318 at the edge location (step 422 of FIG. 4B). MME 330 may then send to SGW-C 342*a* a message which indicates a request for update the bearer (e.g. update bearer request) (step 424 of FIG. 4B). The message which indicates the request to update the bearer may include the TEID of LTE RAN 314 (the eNB), which is the downlink (DL) TEID. SGW-C 342*a* at the central location may send to SGW-U 318 at the edge location a message to modify the PFCP session, and receive a response to such message (step 426 of FIG. 4B). Step 426 may be used to update the DL TEID of LTE RAN 314 (the eNB) at SGW-U 318 at the edge location. The call flow may continue in call flow diagram 400 of FIG. 4C.

In FIG. 4C, connection 370 for UE 306 is shown to be reestablished (step 428 of FIG. C) such that S1-U bearer 383 is between LTE RAN 314 (e.g. the eNB) and SGW-U 318 at the edge location, and S5-U bearer 384 is between SGW-U 318 at the edge location (i.e. the new, current local user plane network function) and the PGW-U (of UPF+PGW-U 341*a*) at the central location. SGW-C 342*a* at the central location may send to SGW-U 340 at the central location a message to delete the PFCP session, and receive a response to such message (step 430 of FIG. 4C). SGW-C 342*a* may send to SMF+PGW-C 342*b* a message which indicates a response to update the bearer (e.g. an update bearer response) (step 432 of FIG. 4C). The message which indicates the response to update the bearer may include the DL TEID of LTE RAN 314 (the eNB). SMF+PGW-C 342*b* may then send to UPF+PGW-U 341*a* at the central location a message to modify the PFCP session, and receive a response to such message (step 434 of FIG. 4C). Step 434 may be used to update the DL TEID of LTE RAN 314 (the eNB) at the PGW-U (of UPF+PGW-U 341*a*) at the central location. As the DL TEID has been properly reallocated, DL data may be communicated between the PGW-U (of UPF+PGW-U 341*a*) at the central location and LTE RAN 314 (the eNB) (step 436 of FIG. 4C). As a result of the call flow of FIGS. 4A-4C, the SGW-U is effectively moved or relocated from the central location to the edge location (i.e. SGW-U 340 at the central location is moved or relocated to or as SGW-U 318 at the edge location).

Continuing with FIG. 4C, and as an alternative response to step 408 and/or 410 of FIG. 4A, SGW-C 342*a* at the central location may determine that no new SGW-U should be allocated (step 438 of FIG. 4C). In response, SGW-C 342*a* may send to SMF+PGW-C 342*b* a message which indicates a response to update the bearer (e.g. an update bearer response), with a cause which indicates no SGW-U change (step 440 of FIG. 4C).

Regarding the call flow of FIGS. 4A-4C described above, note that SGW-U relocation for handovers may be possible in 3GPP TS 23.401, but the specifications do not allow a SGW-U relocation unless the SGW-C is also moved. Also, there is no conventional procedure for SGW-U relocation that is triggered by the PGW-C that is also independent of mobility. Such PGW-C relocation would be required, as the relocation of the SGW-U is not just driven by mobility of the UE, but is triggered from an application function with which the UE is communication, an application which is located in the edge. Also in the above-described procedure, the SMF+PGW-C provides a DNAI location to the SGW-C, which in turn selects an SGW-U that is located in the edge location; this information may be provided as a new Information Element (IE) according to some implementations. Further in the above-described procedure, the SGW-C informs the MME of a new SGW-U which, according to current 3GPP specifications, is not allowed to be updated.

Figure 5A:
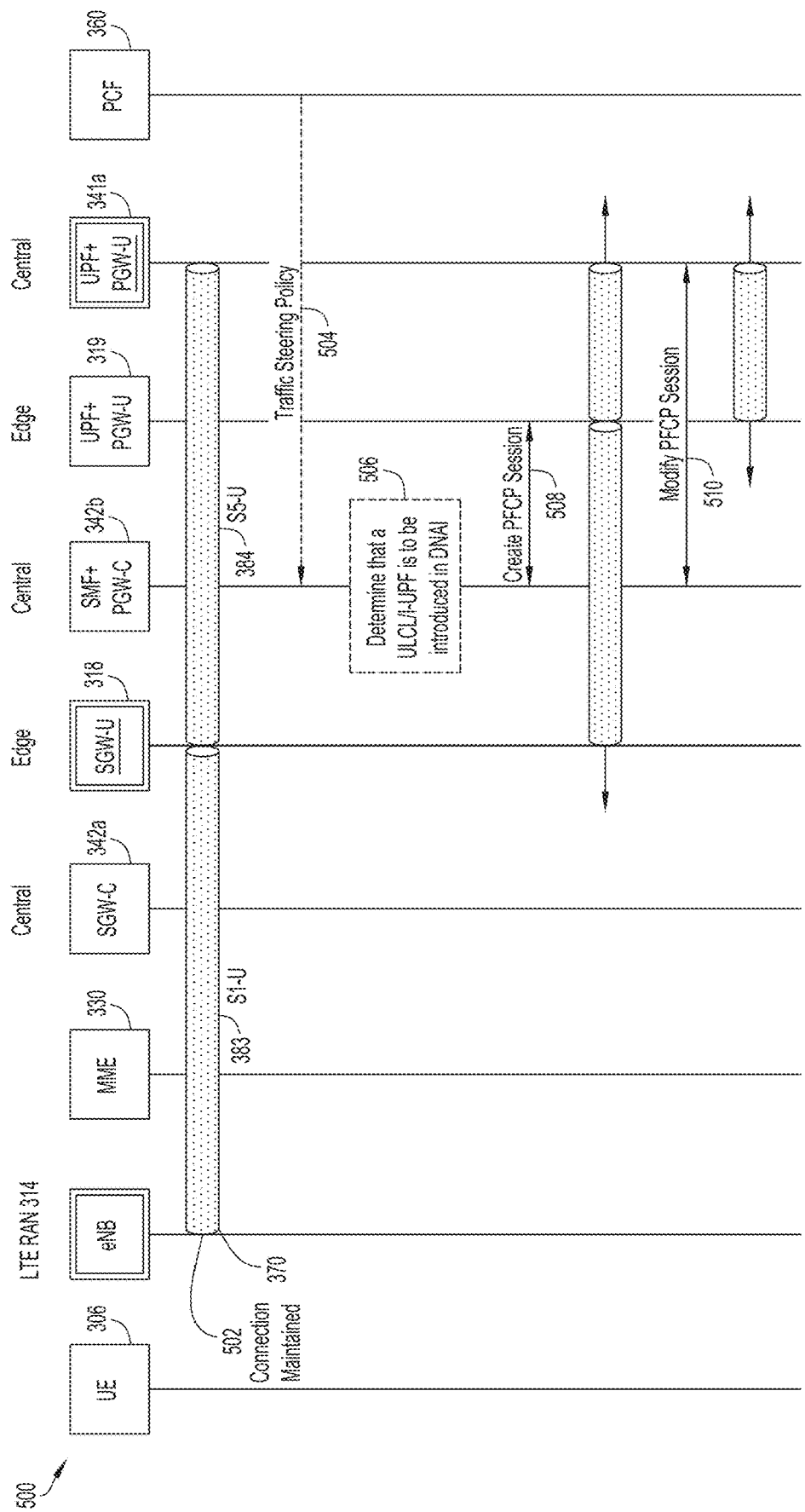
FIGS. 5A-5B form a call flow diagram for describing a call flow for establishing local traffic offloading for a UE in a mobile network having a converged core architecture according to some implementations of the present disclosure, specifically relating to a second step for inserting a second local user plane function with an uplink classifier at the edge location (e.g. co-located with the first local user plane function)
Figure 5B:
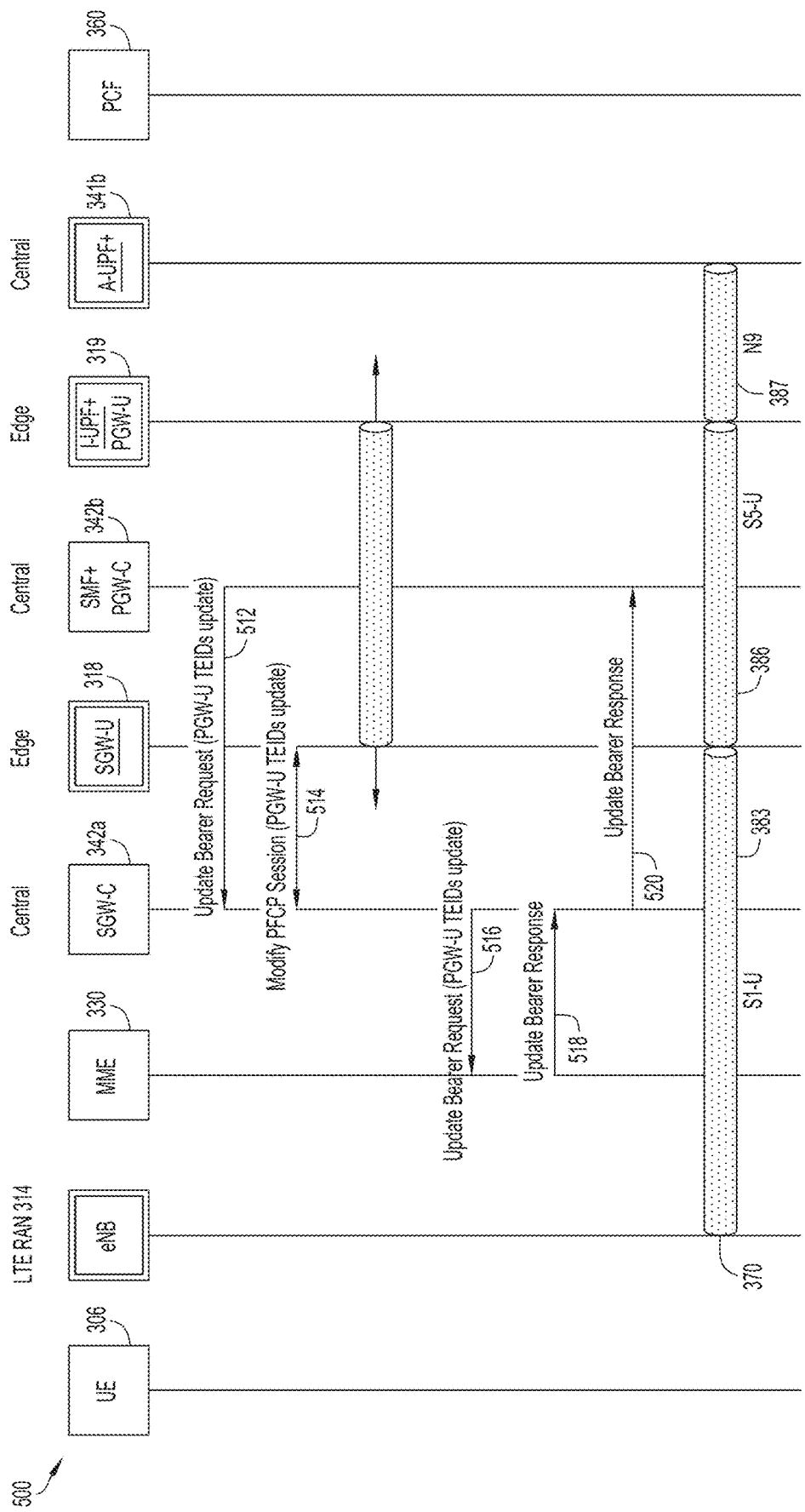

FIGS. 5A-5B form a call flow diagram 500 for describing a call flow for establishing local traffic offloading ("edge offload") for a UE in a mobile network having a converged core architecture according to some implementations. In particular, the call flow diagram 500 of the call flow relates to the insertion of the second local user plane function with the uplink classifier at the edge location (e.g. the local I-UPF with UL-CL) associated with step 210 of FIG. 2, which may result in the connection shown in FIG. 3C. In some implementations, the call flow of FIGS. 5A-5B may proceed (e.g. immediately) after the call flow of FIGS. 4A-4C.

In FIG. 5A, connection 370 for UE 306 is maintained as a result of the procedure of the call flow of FIGS. 4A-4C (e.g. from step 402 of FIG. 4A). More particularly, connection 370 is an intermediate connection which may managed by the control plane (e.g. at least in part by SMF+PGW-C 342*b*) (step 502 of FIG. 5A). Connection 370 may be defined at least in part by S1-U bearer 383 between LTE RAN 314 (e.g. the eNB) and SGW-U 318 at the edge location, and S5-U bearer 384 between SGW-U 318 at the edge location and the PGW-U (of UPF+PGW-U 341*a*) at the central location. PCF 360 may send to SMF+PGW-C 342*b* a message which includes a traffic steering policy (step 504 of FIG. 5A). SMF+PGW-C 342*b* at the central location may receive and process this message including the traffic steering policy, and determine whether an UL-CL/I-UPF should be introduced in the data network at the edge location of UE 306 (step 506 of FIG. 5A). For I-UPF insertion, SMF+PGW-C 342*b* may send to UPF+PGW-U 319 at the edge location a message to create a PFCP session and receive a response to such message (step 508 of FIG. 5A). This step is performed to initiate the reestablishment of the bearers as illustrated, to be between SGW-U 318 and UPF+PGW-U 319 (to be the I-UPF with UL-CL) at the edge locations, and between UPF+PGW-U 319 at the edge location and UPF+PGW-U 341*a* (to be the A-UPF) at the central location. SMF+PGW-C 342*b* may send to UPF+PGW-U 341*a* (to be the A-UPF) at the central location a message to modify the PFCP session, and receive a response to such message (step

510 of FIG. 5A) These steps assist in reestablishing the bearer between UPF+PGW-U 319 (to be the I-UPF with UL-CL) at the edge location and UPF+PGW-U 341a (to be the A-UPF) at the central location. The call flow may continue in call flow diagram 500 of FIG. 5B.

SMF+PGW-C 342b may send to SGW-C 342a a message which indicates a request to update the bearer (e.g. an update bearer request) (step 512 of FIG. 5B). The message which indicates the request to update the bearer may include the TED of the PGW-U (to be the I-UPF with UL-CL) at the edge location. SGW-C 342a at the central location may send to SGW-U 318 at the edge location a message to modify the PFCP session, and receive a response to such message (step 514 of FIG. 5B). Step 514 may be used to update SGW-U 318 at the edge location with the UL TED of the PGW-U at the edge location (now I-UPF+PGW-U 319 at the edge location), to assist in reestablishment of the bearer to be between SGW-U 318 and I-UPF+PGW-U 319 at the edge locations as illustrated. SGW-C 342a may send to MME 330 a message which indicates a request to update the bearer (e.g. an update bearer request) (step 516 of FIG. 5B). The message which indicates the request to update the bearer may include the TEID of the PGW-U (i.e. I-UPF+PGW-U 319 with UL-CL) at the edge location. MME 330 may send to SGW-C 342a a message which indicates a response to update the bearer (e.g. an update bearer response) (step 518 of FIG. 5B). SGW-C 342a may send to SMF+PGW-C 342b a message which indicates a response to update the bearer (e.g. an update bearer response) (step 520 of FIG. 5B). These responses may include the DL TEID for updating the DL TEIDs at I-UPF+PGW-U 319. In some implementations, the above-described steps may include similar steps or substeps as described in relation to steps 416-434 of FIGS. 4B-4C.

As a result of the call flow of FIGS. 5A-5B, the PGW-U is effectively moved or relocated from the central location to the edge location (i.e. the PGW-U at the central location is moved or relocated as I-UPF+PGW-U 319 with the UL-CL at the edge location). Connection 370 is now defined at least in part by S1-U bearer 383 between LTE RAN 314 (e.g. the eNB) and SGW-U 318 at the edge location, S5-U bearer 386 between SGW-U 318 at the edge location and I-UPF+PGW-U 319 at the edge location, and an N9 connection 387 between I-UPF+PGW-U 319 and A-UPF 341b at the central location.

Regarding the call flow of FIGS. 5A-5B described above, from a 4G/EPC perspective, the I-UPF plays the role of an intermediate PGW-U; there is no concept of an I-PGW-U in 4G. Thus, to achieve the desired outcome described above, the PGW-U (from the MME and SGW perspective) is relocated or moved to the edge location. One notable aspect in this procedure is the updating of the PGW-U TEID which is not supported in call flows associated with the EPC.

Figure 6:
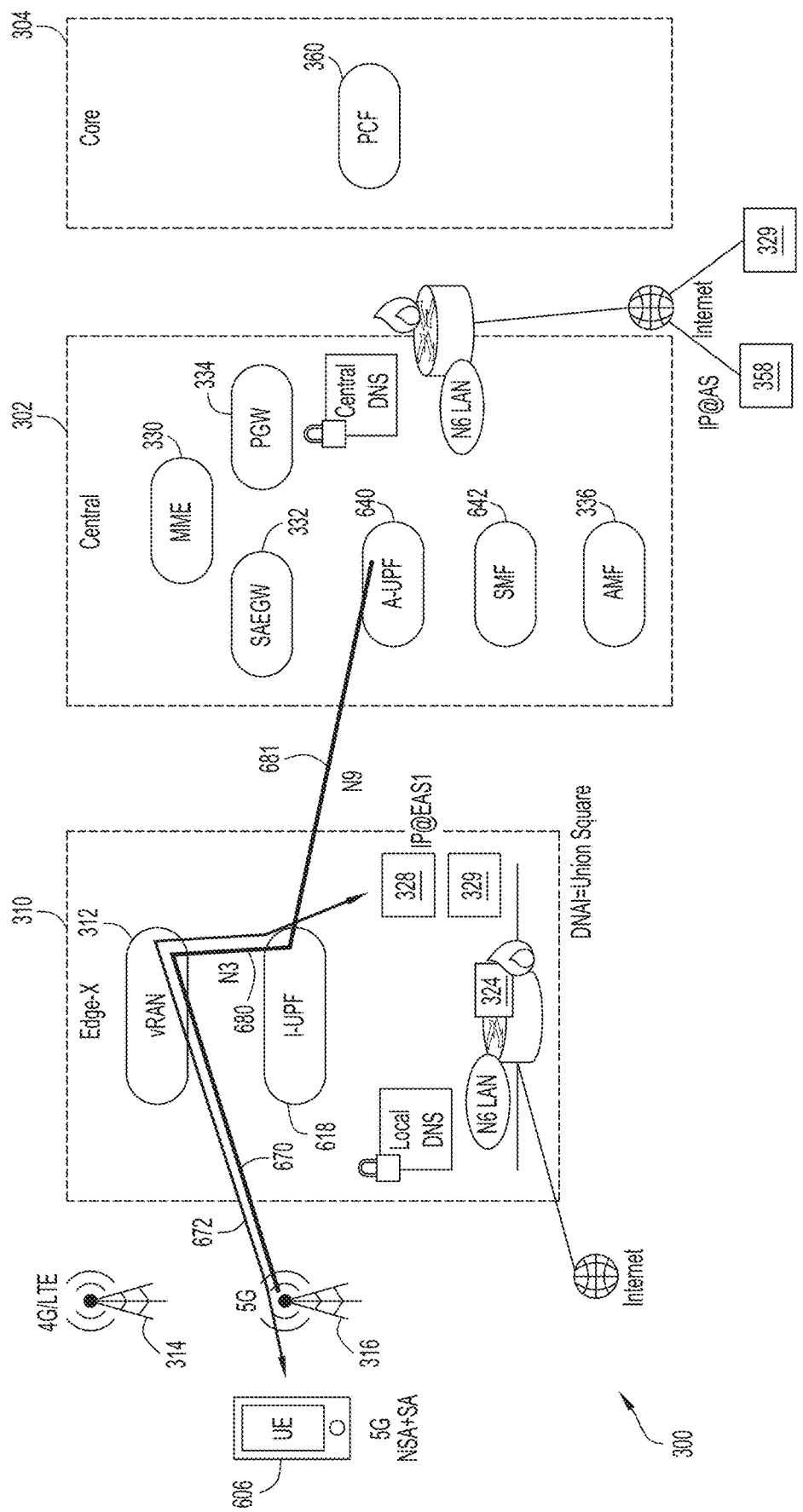
FIG. 6 is an illustrative scenario in the mobile network having the converged core architecture configured to support communications for the UE via the second RAN (i.e. the 5G RAN) with local offloading according to conventional operation.

FIG. 6 is an illustrative scenario of the 3GPP mobile network 300 having the converged core architecture, where a UE 606 is operating via 5G RAN 316 with local offloading according to conventional operation. Here, UE 606 may be configured to operate via LTE RAN 314 or 5G RAN 316 of the 3GPP mobile network 300 (e.g. non-standalone, standalone configuration), and, in the illustrative scenario of FIG. 6, UE 606 is operating via 5G RAN 316. Again, edge offload in a 5G network is captured in 3GPP TS 23.501 and TS 23.502, and enhancements for edge offloading are being captured in Release 17 (Rel-17), 3GPP TS 23.548. In an edge offload per the specifications, traffic is offloaded from an I-UPF 618 at the edge location 310, with use of an UL-CL provisioned therein to offload selected traffic to the edge. An A-UPF 640 which advertises the IP address of UE 606 may be located at central location 302. Here, a connection 670 of UE 606 may be managed by an SMF 642 and defined at least by an N3 connection 680 between vRAN 312 and I-UPF 618 having the UL-CL at edge location 310, and an N9 connection 681 between I-UPF 618 and A-UPF 640 at central location 302. As illustrated, a portion of data traffic 672 associated with one or more data flows may be routed via the local N6 LAN at edge location 310.

Thus, techniques and mechanisms for establishing edge offloading in a mobile network having a converged core architecture have been described. In one illustrative example, a method is described for establishing local traffic offloading for a UE by a CP function for session management of a mobile network having a converged core architecture that supports communications of the UE via a first RAN of a first RAN type and a second RAN of a second RAN type. In some implementations, the converged core architecture may be or include an EPC and 5G converged core, the first RAN may be of an LTE RAN type, and the second RAN may be of a 5G RAN type. The UE may operate in the mobile network having the converged core architecture via the first RAN (i.e. the LTE RAN), and in some implementations, the UE may be a 4G/LTE-only operational device.

In the method, a connection is established for the UE operating via the first RAN of the first RAN type (e.g. the LTE RAN type). The connection may include a first bearer between the RAN and a first central user plane network function at a central location, and a second bearer between the first central user plane network function and a second central user plane network function at the central location. The CP function for session management may manage the connection for the UE operating via the first RAN of the first RAN type. With this connection as the starting point, the CP function for session management may perform a procedure for establishing local traffic offloading ("edge offload") for the UE. The procedure for establishing local traffic offloading may include communicating one or more first messages for inserting a first local user plane network function at an edge location. The one or more first messages for inserting the first local user plane network function at the edge location may be communicated to update the first bearer to be between the RAN and the first local user plane network function at the edge location, and the second bearer to be between the first local user plane network function at the edge location and the second central user plane network function at the central location. The procedure for establishing local traffic offloading may further include communicating one or more second messages for inserting a second local user plane network function with an uplink classifier at the edge location. The one or more second messages for inserting the second local user plane network function with the uplink classifier at the edge location may be communicated to update the second bearer to be between the first and the second local user plane network functions at the edge location, and to establish a third bearer of the connection to be between the second local user plane network function at the edge location and a third central user plane network function at the central location.

In some implementations, the CP function for session management may be a converged CP function for session management (e.g. an SMF+PGW-C) at the central location. In an EPC and 5G converged core, the first central user plane network function at the central location may be a central SGW-U; the second central user plane network function at the central location may be a central UPF+PGW-U; the first local user plane network function at the edge location may be a local SGW-U; the second local user plane network function at the edge location may be a local I-UPF+PGW-U having the UL-CL; and the third central user plane network function at the central location may be a central A-UPF. In some implementations, the first bearer may be an S1-U bearer, the second bearer may be an S5-U bearer, and the third bearer may be an N9 connection.

In some implementations, communicating the one or more first messages for inserting the first local user plane network function (e.g. the local SGW-U) at the edge location may involve communicating a first message which indicates a request for bearer update (e.g. an update bearer request), where the message includes a DNAI associated with the edge location. In some implementations, communicating the first message which indicates the request for bearer update causes a corresponding message which indicates the request for bearer update (e.g. an update bearer request) to be communicated to a mobility management entity, where the corresponding message includes an identifier associated with the first local user plane network function at the edge location. In some implementations, the identifier associated with the first local user plane network function at the edge location may be a TED. In some implementations, communicating the one or more second messages for inserting the second local user plane network function (e.g. the local I-UPF+PGW-U) with the UL-CL at the edge location may involve communicating a second message which indicates a request for bearer update (e.g. an update bearer request), where the second message includes an identifier associated with the second local user plane network function with the uplink classifier at the edge location. In some implementations, the identifier associated with the second local user plane network function with the uplink classifier at the edge location may be a TEID.

In another illustrative example, a computer program product comprises a non-transitory computer readable medium and instructions in the non-transitory computer readable medium, where the instructions are executable by one or more processors of the CP function for session management of the mobile network having the converged core architecture for performing the method as described above.

In yet another illustrative example, a network node comprising a CP function for session management of a mobile network is described, with the mobile network having an EPC and 5G converged core configured to support communications of a UE via an LTE RAN and a 5G RAN. The network node has one or more processors, one or more interfaces to connect in the mobile network, and one or more memory elements for storing instructions executable on the one or more processors for operation as the CP function for session management. The one or more processors may operate for managing a connection for the UE operating via the LTE RAN, where the connection includes a first bearer between the LTE RAN and a central SGW-U at a central location, and a second bearer between the central SGW-U at the central location and a central UPF+PGW-U at the central location. The one or more processors may further operate for performing a procedure for establishing local traffic offloading ("edge offload") for the UE. Performing the procedure for establishing the local traffic offloading for the UE may involve communicating one or more first messages for inserting a local SGW-U at an edge location, to update the first bearer to be between the LTE RAN and the local SGW-U at the edge location, and the second bearer to be between the local SGW-U at the edge location and the central UPF+PGW-U at the central location. Performing the procedure for establishing the local traffic offloading for the UE may further involve communicating one or more second messages for inserting a local I-UPF+PGW-U with an UL-CL at the edge location, to update the second bearer to be between the local SGW-U and the local I-UPF+PGW-U with the UL-CL at the edge location, and to establish a third bearer of the connection to be between the local I-UPF+UPF with an UL-CL at the edge location and a central A-UPF at the central location.

In some implementations, the one or more processors are further operative for communicating the one or more first messages for inserting the local SGW-U at the edge location by communicating a first message which indicates a request for bearer update (e.g. an update bearer request), where the first message includes a DNAI associated with the edge location, In some implementations, communicating the first message causes a corresponding message which indicates the request for bearer update (e.g. an update bearer request) to be communicated to an MME, where the corresponding message includes a TEID associated with the local SGW-U at the edge location. In some implementations, the one or more processors are further operative for communicating the one or more second messages for inserting the local I-UPF+PGW-U with the UL-CL at the edge location by communicating a second message which indicates a request for bearer update (e.g. an update bearer request), the second message including a TEID associated with the local I-UPF+PGW-U with the UL-CL at the edge location. In some implementations, the first bearer comprises an S1-U bearer, the second bearer comprises an S5-U bearer, and the third bearer comprises an N9 connection. In some implementations, the CP function for session management may be an SMF+PGW-C at the central location.

Figure 7:
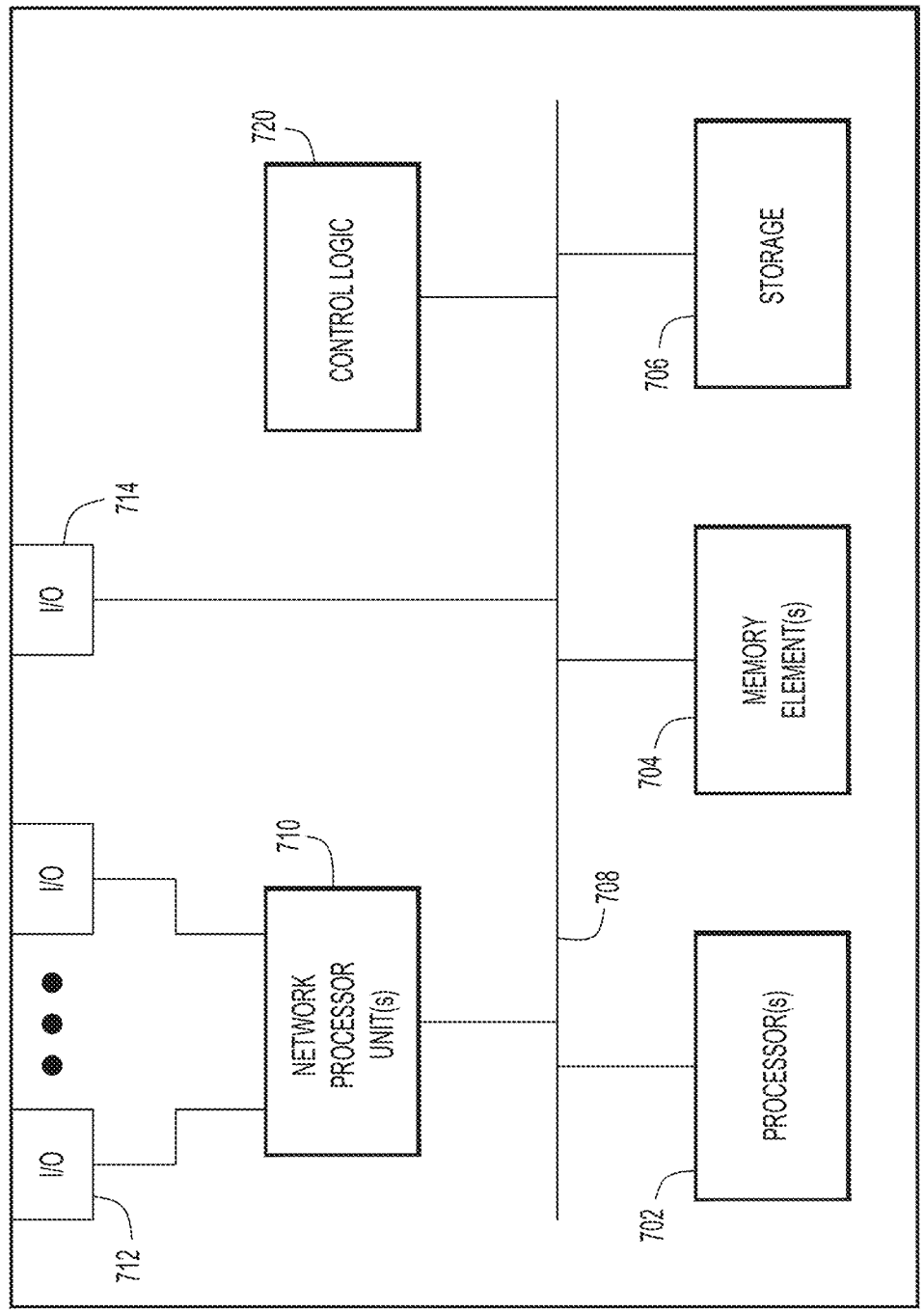
FIG. 7 illustrates a hardware block diagram of a computing device that may perform functions associated with operations of a control plane function for session management according to some implementations of the present disclosure.

FIG. 7 illustrates a hardware block diagram of a computing device 700 that may perform functions associated with operations discussed herein in connection with the techniques described in relation to the above figures. In various embodiments, a computing device, such as computing device 700 or any combination of computing devices 700, may be configured as any entity/entities as discussed for the techniques depicted in connection with the figures in order to perform operations of the various techniques discussed herein. In particular, computing device 700 may perform operations of a control plane function for session management (e.g. an SGW-C, an SMF, an SMF+PGW-C, etc.) for operation in accordance with the method of FIG. 2, FIGS. 3A-3C, and/or may perform operations according to any one of the call flows of FIGS. 4A-4C and FIGS. 5A-5B.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    at a control plane (CP) function for session management of a mobile network having a converged core architecture to support communications of a user equipment (UE) via a first radio access network (RAN) of a first RAN type and a second RAN of a second RAN type,
    managing a connection for the UE operative via the first RAN of the first RAN type, the connection including a first bearer between the first RAN and a first central user plane network function at a central location, and a second bearer between the first central user plane network function and a second central user plane network function at the central location; and
    performing a procedure for establishing local traffic offloading for the UE, which includes communicating one or more first messages for inserting a first local user plane network function at an edge location, to update the first bearer to be between the first RAN and the first local user plane network function at the edge location, and the second bearer to be between the first local user plane network function at the edge location and the second central user plane network function at the central location, and communicating one or more second messages for inserting a second local user plane network function with an uplink classifier at the edge location, to update the second bearer to be between the first and the second local user plane network functions at the edge location, and to establish a third bearer of the connection to be between the second local user plane network function at the edge location and a third central user plane network function at the central location, wherein the second local user plane network function comprises an intermediate user plane function and a packet data network gateway-user plane with the uplink classifier.

2. The method of claim 1, wherein communicating the one or more first messages for inserting the first local user plane network function at the edge location comprises:
    communicating a message which indicates a request for bearer update, the message including a data network access identifier (DNAI) associated with the edge location.

3. The method of claim 2, wherein communicating the message which indicates the request for bearer update causes a corresponding message which indicates the request for bearer update to be communicated to a mobility management entity, the corresponding message including an identifier associated with the first local user plane network function at the edge location.

4. The method of claim 3, wherein the identifier associated with the first local user plane network function at the edge location comprises a tunnel endpoint identifier.

5. The method of claim 1, wherein communicating the one or more second messages for inserting the second local user plane network function with the uplink classifier at the edge location further comprises:
    communicating a message which indicates a request for bearer update, the message including an identifier associated with the second local user plane network function with the uplink classifier at the edge location.

6. The method of claim 5, wherein the identifier associated with the second local user plane network function at the edge location comprises a tunnel endpoint identifier.

7. The method of claim 1, wherein:
    the converged core architecture comprises an Evolved Packet Core (EPC) and Fifth Generation (5G) converged core,
    the CP function for session management comprises a converged CP function for session management at the central location,
    the first RAN is of a Long-Term Evolution (LTE) RAN type, and
    the second RAN is of a 5G RAN type.

8. The method of claim 7, wherein:
    the first central user plane network function at the central location comprises a central serving gateway-user plane (SGW-U),
    the second central user plane network function at the central location comprises a central user plane function (UPF) and packet data network gateway-user plane (PGW-U)(UPF+PGW-U),
    the first local user plane network function at the edge location comprises a local SGW-U, and
    the third central user plane network function at the central location comprises a central anchor UPF (A-UPF).

9. The method of claim 8, wherein:
    the first bearer comprises an S1-U bearer,
    the second bearer comprises an S5-U bearer, and
    the third bearer comprises an N9 connection.

10. A computer program product comprising:
    a non-transitory computer readable medium;
    instructions in the non-transitory computer readable medium;
    the instructions being executable by one or more processors of a control plane (CP) function for session management of a mobile network having a converged core architecture to support communications of a user equipment (UE) via a first radio access network (RAN) of a first RAN type and a second RAN of a second RAN type, the instructions being executable for:
        managing a connection for the UE operating via the first RAN of the first RAN type, the connection including a first bearer between the first RAN and a first central user plane network function at a central location, and a second bearer between the first central user plane network function and a second central user plane network function at the central location; and
        performing a procedure for establishing local traffic offloading for the UE, which includes communicating one or more first messages for inserting a first local user plane network function at an edge location, to update the first bearer to be between the first RAN and the first local user plane network function at the edge location, and the second bearer to be between the first local user plane network function at the edge location and the second central user plane network function at the central location, and communicating one or more second messages for inserting a second local user plane network function with an uplink classifier at the edge location, to update the second bearer to be between the first and the second local user plane network functions at the edge location, and to establish a third bearer of the connection to be between the second local user plane network function at the edge location and a third central user plane network function at the central location, wherein the second local user plane network function comprises an intermediate user plane function and a packet data network gateway-user plane with the uplink classifier.

11. The computer program product of claim 10, wherein the instructions are further executable for communicating the one or more first messages for inserting the first local user plane network function at the edge location by:
communicating a message which indicates a request for bearer update, the message including a data network access identifier (DNAI) associated with the edge location.

12. The computer program product of claim 11, wherein the instructions are further executable for communicating the message which indicates the request for bearer update to cause a corresponding message which indicates the request for bearer update to be communicated to a mobility management entity, the corresponding message including a tunnel endpoint identifier associated with the first local user plane network function at the edge location.

13. The computer program product of claim 10, wherein the instructions are further executable for communicating the one or more second messages for inserting the second local user plane network function with the uplink classifier at the edge location by:
communicating a message which indicates a request for bearer update, the message including a tunnel endpoint identifier associated with the second local user plane network function with the uplink classifier at the edge location.

14. The computer program product of claim 10, wherein:
the first central user plane network function at the central location comprises a central serving gateway-user plane (SGW-U),
the first local user plane network function at the edge location comprises a local SGW-U,
the second local user plane network function at the edge location comprises a local intermediate UPF (I-UPF) and PGW-U (I-UPF+PGW-U) with the uplink classifier (UL-CL), and
the third central user plane network function at the central location comprises a central anchor UPF (A-UPF).

15. A network node comprising a control plane (CP) function for session management of a mobile network, the mobile network having an Evolved Packet Core (EPC) and Fifth Generation (5G) converged core configured to support communications of a user equipment (UE) via a first Long-Term Evolution (LTE) radio access network (RAN) and a 5G RAN, the network node comprising:
one or more processors;
one or more interfaces to connect in the mobile network; and
one or more memory elements for storing instructions executable on the one or more processors for operation as the CP function for session management for:
managing a connection for the UE operating via the LTE RAN, the connection including a first bearer between the LTE RAN and a central serving gateway-user plane (SGW-U) at a central location, and a second bearer between the central SGW-U at the central location and a central user plane function (UPF) and packet gateway-user plane (PGW-U) (UPF+PGW-U) at the central location;
performing a procedure for establishing local traffic offloading for the UE;
wherein performing the procedure for establishing the local traffic offloading for the UE includes communicating one or more first messages for inserting a local SGW-U at an edge location, to update the first bearer to be between the LTE RAN and the local SGW-U at the edge location, and the second bearer to be between the local SGW-U at the edge location and the central UPF+PGW-U at the central location; and
wherein performing the procedure for establishing the local traffic offloading for the UE further includes communicating one or more second messages for inserting a local intermediate user plane function (I-UPF) and PGW-U (I-UPF+PGW-U) with an uplink classifier (UL-CL) at the edge location, to update the second bearer to be between the local SGW-U and the local I-UPF+PGW-U with the UL-CL at the edge location, and to establish a third bearer of the connection to be between the local I-UPF+PGW-U at the edge location and a central anchor UPF (A-UPF) at the central location.

16. The network node of claim 15, wherein the one or more processors are further operative for communicating the one or more first messages for inserting the local SGW-U at the edge location by:
communicating a message which indicates a request for bearer update, the message including a data network access identifier (DNAI) associated with the edge location, which causes a corresponding message which indicates the request for bearer update to be communicated to a mobility management entity (MME), the corresponding message including a tunnel endpoint identifier (TEID) associated with the local SGW-U at the edge location.

17. The network node of claim 15, wherein the one or more processors are further operative for communicating the one or more second messages for inserting the local I-UPF+PGW-U with the UL-CL at the edge location by:
communicating a message which indicates a request for bearer update, the message including a tunnel endpoint identifier (TEID) associated with the local I-UPF+PGW-U with the UL-CL at the edge location.

18. The network node of claim 15, wherein:
the first bearer comprises an S1-U bearer,
the second bearer comprises an S5-U bearer, and
the third bearer comprises an N9 connection.

19. The computer program product of claim 10, wherein:
the first bearer comprises an S1-U bearer,
the second bearer comprises an S5-U bearer, and
the third bearer comprises an N9 connection.

20. The computer program product of claim 10, wherein:
the converged core architecture comprises an Evolved Packet Core (EPC) and Fifth Generation (5G) converged core, the CP function for session management comprises a converged CP function for session management at the central location,
the first RAN is of a Long-Term Evolution (LTE) RAN type, and
the second RAN is of a 5G RAN type.

* * * * *